T. E. BROWN & C. T. WESTLIN.
MACHINE FOR USE IN GATHERING COTTON.
APPLICATION FILED FEB. 3, 1914.

1,129,164.

Patented Feb. 23, 1915.
4 SHEETS—SHEET 4.

UNITED STATES PATENT OFFICE.

THOMAS E. BROWN, OF NEW YORK, N. Y., AND CARL T. WESTLIN, OF ARLINGTON, NEW JERSEY, ASSIGNORS TO THE COTTON MACHINERY COMPANY, OF NEW YORK, N. Y., A CORPORATION OF NEW YORK.

MACHINE FOR USE IN GATHERING COTTON.

1,129,164.   Specification of Letters Patent.   Patented Feb. 23, 1915.

Application filed February 3, 1914. Serial No. 816,174.

*To all whom it may concern:*

Be it known that we, THOMAS E. BROWN and CARL T. WESTLIN, respectively a citizen of the United States and a subject of the King of Sweden, and respectively residing in the city, county, and State of New York, and Arlington, Hudson county, State of New Jersey, have made a certain new and useful Invention in Machines for Use in Gathering Cotton, of which the following is a specification.

This invention relates to machines for use in gathing cotton.

The object of the invention is to provide a machine which is simple in construction, strong, durable and efficient in operation, for use in gathering cotton.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Figure 1:
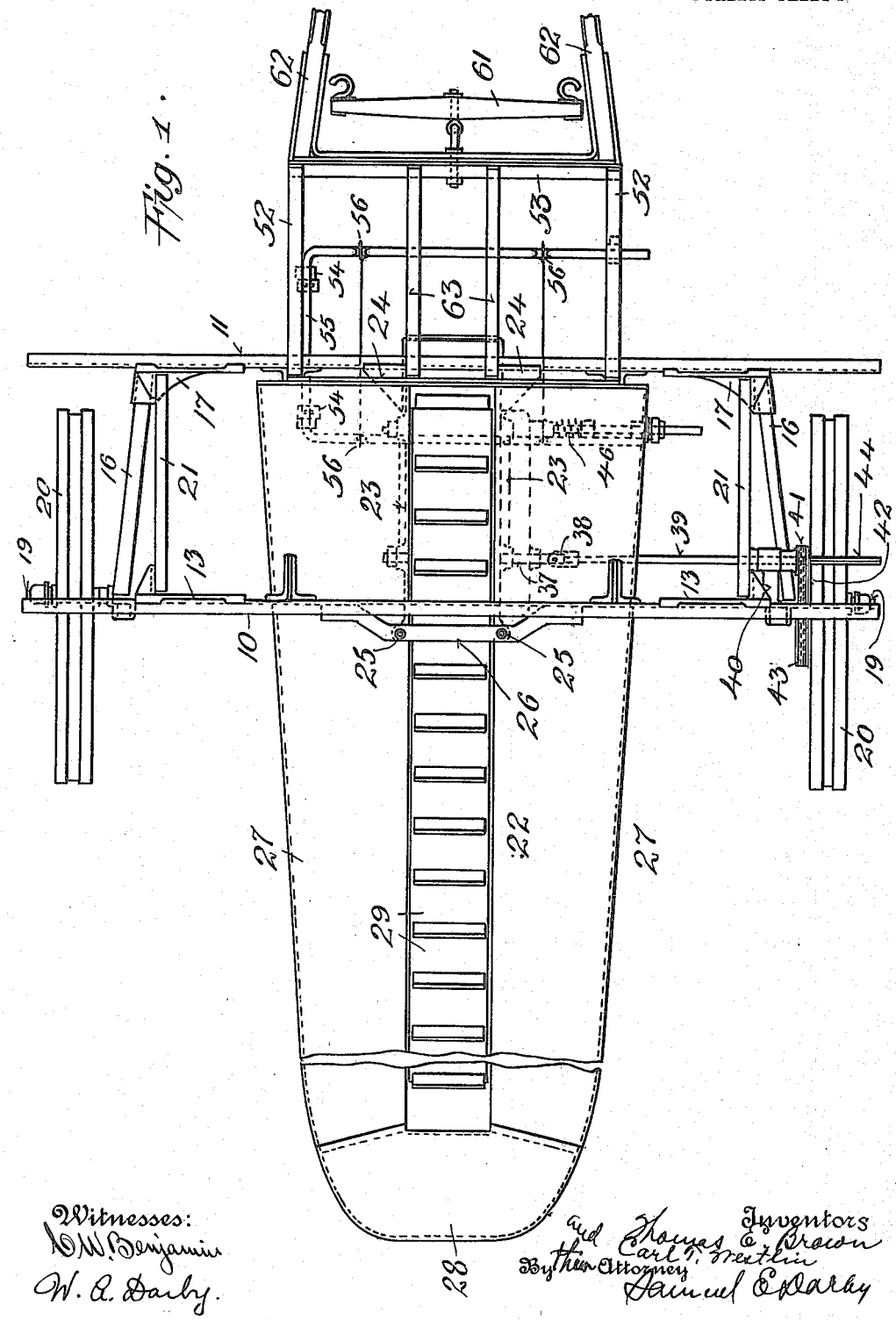
Figure 2:
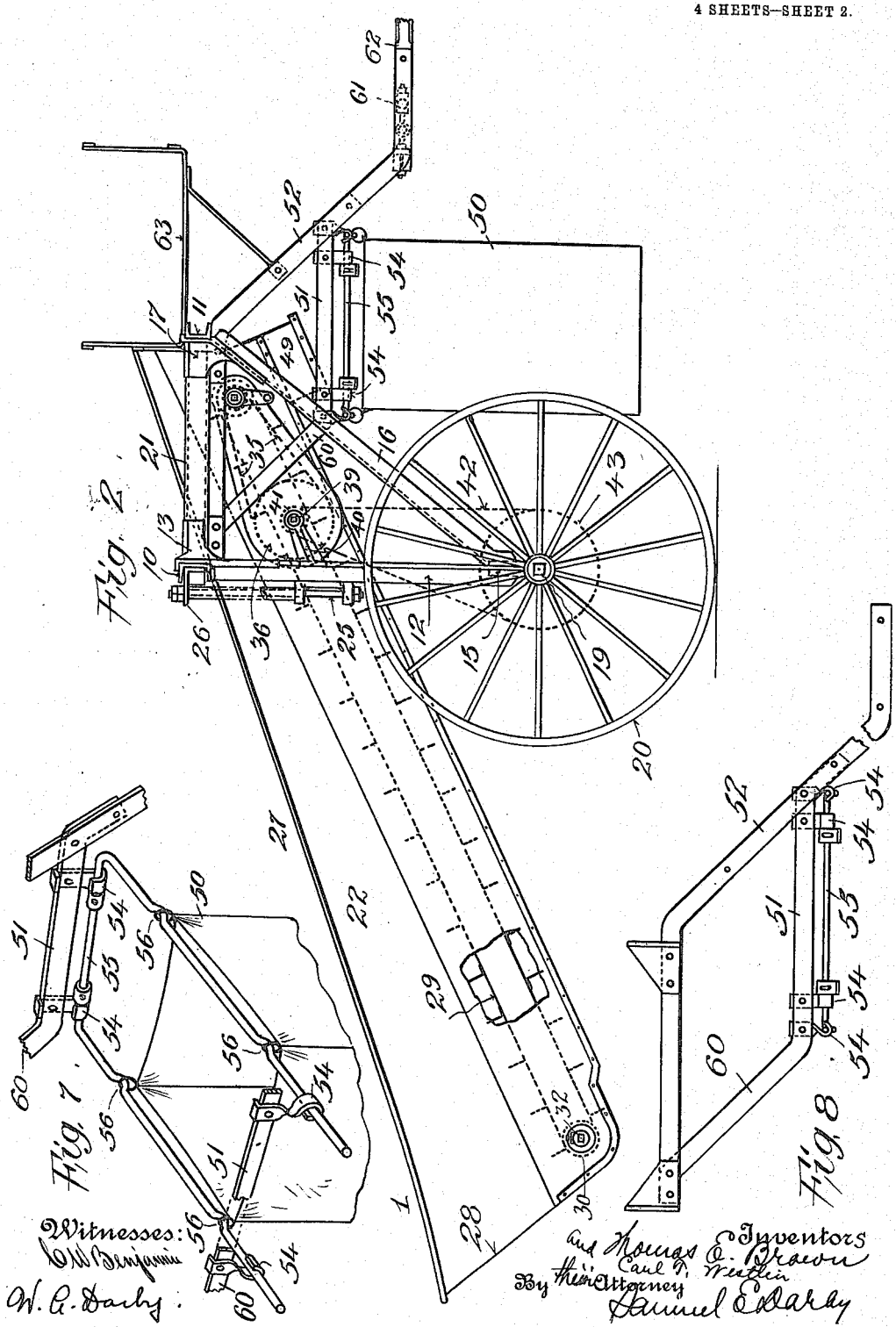
Figure 3:
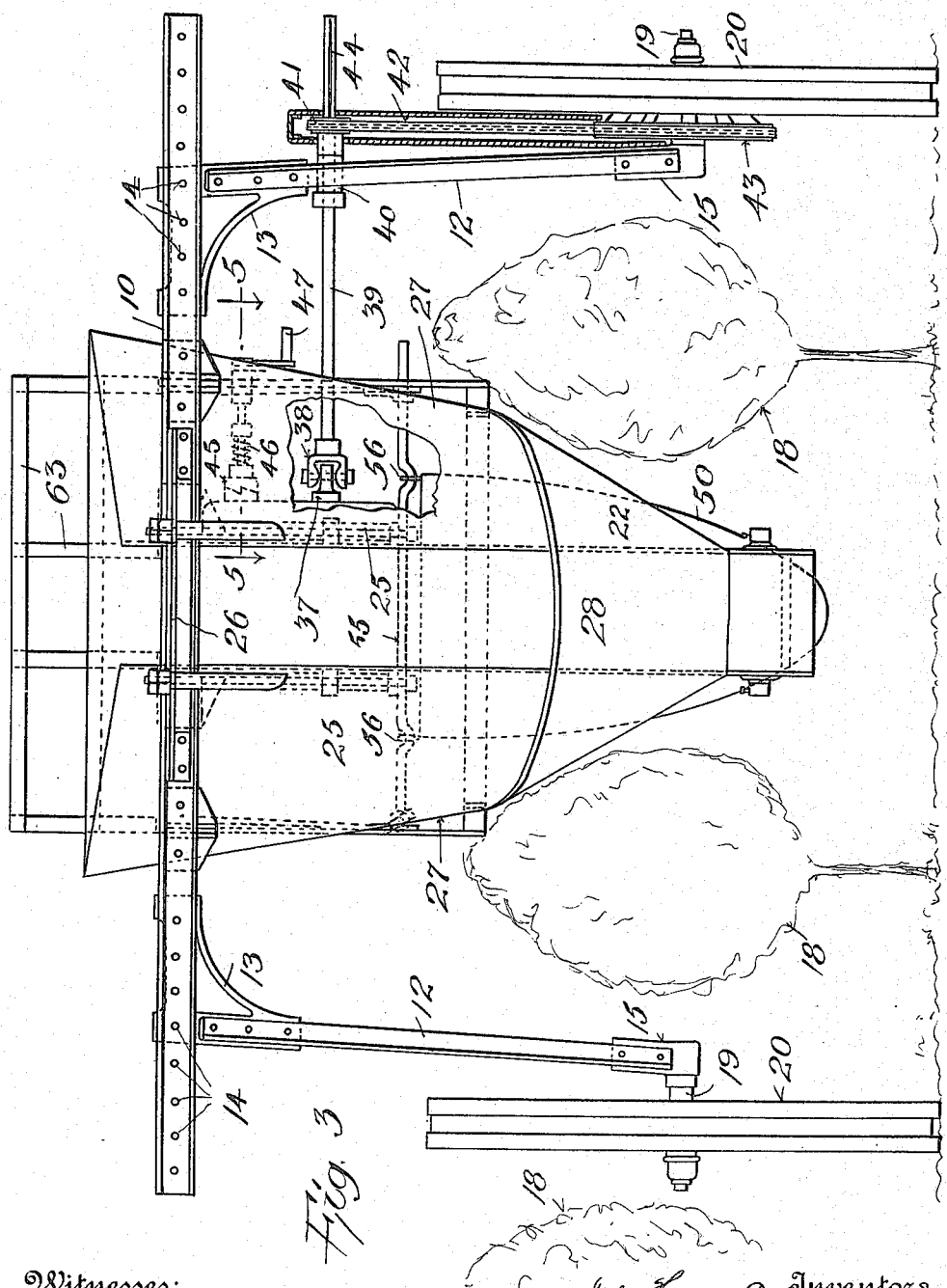
Figure 4:
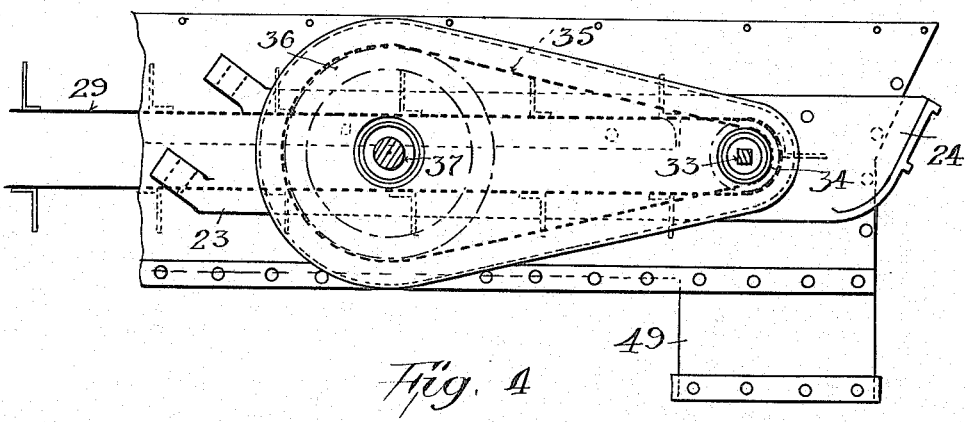
Figure 5:
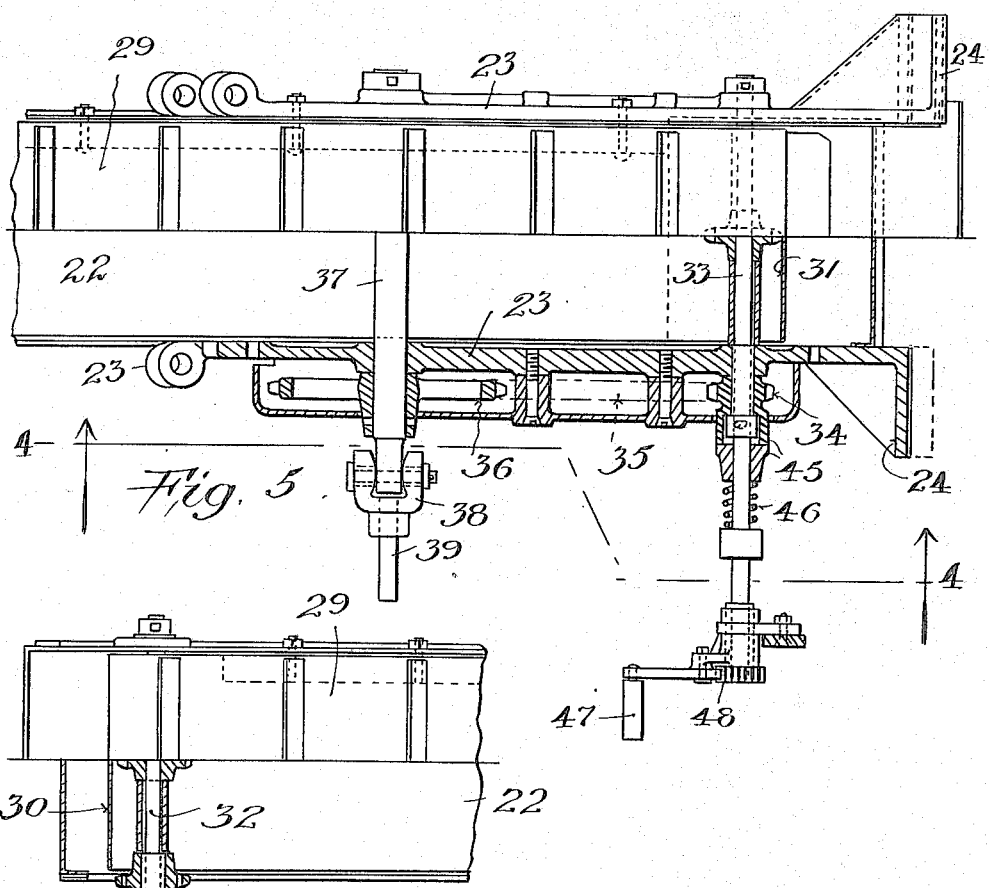
Figure 6:
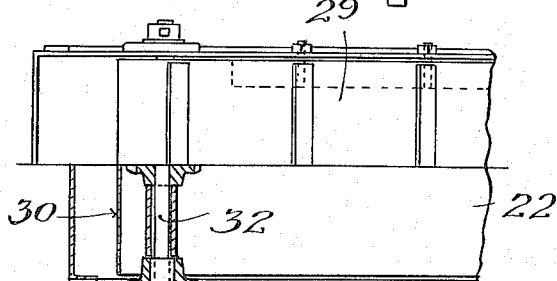

In the drawings: Figure 1 is a plan view of a machine for use in gathering cotton and which embodies the principles of our invention. Fig. 2 is a side elevation. Fig. 3 is a rear elevation. Fig. 4 is a broken detail view in vertical section on the line 4, 4, Fig. 5, showing in side elevation the delivery end of the conveyer frame. Fig. 5 is a broken detail view in plan of the construction shown in Fig. 4, parts in horizontal section on the line 5, 5, Fig. 3. Fig. 6 is a broken detail view partly in top plan and partly in horizontal section, showing the lower end of the conveyer frame. Fig. 7 is a broken detail view in perspective showing means for supporting the bag in position to receive the cotton delivered from the conveyer. Fig. 8 is a broken detail view in side elevation of the same.

The same part is designated by the same reference numeral wherever it occurs throughout the several views.

The machine embodying the principles of our invention particularly relates to that type of apparatus for use in gathering cotton wherein the machine is moved through the cotton field and lengthwise of the rows of cotton stalks and is provided with a downwardly and rearwardly inclined frame which trails between adjacent rows of cotton stalks, in which frame is carried a conveyer, the sides and lower end of the trailing frame being closed to form a hopper in which the conveyer operates, the upper side of the hopper being open and its sides outwardly flared. In the use of machines of this type the laborers gather or pick the cotton by hand and throw or deposit the same into the hopper as the machine progresses through the field, the conveyer serving to elevate and finally deliver the cotton so deposited in the hopper into a bag carried by the machine and suitably positioned with reference to the delivery end of the conveyer to receive the cotton therefrom. In machines of this class it is desirable to provide a simple, light but strong and durable frame and which is readily adjustable to accommodate within reasonable limits, any desired distance apart of the rows of cotton stalks. It is also desirable to provide means for efficiently supporting the bag in position to receive the picked cotton as delivered from the conveyer, and in such manner that when a bag becomes filled it may be readily and easily detached and replaced by an empty bag. In machines of this class it is usual to employ gearing actuated from the supporting wheels of the machine for driving the conveyer. In such cases it is desirable to provide means whereby in case the machine should remain standing in one place too long while the cotton picking operations are being carried on, or in case the machine should move too slowly through the field to deliver the picked cotton with sufficient rapidity, the conveyer may be operated manually and independently of the drive gearing so as to prevent the hopper from becoming overloaded or choked up with the picked cotton.

It is among the special purposes of our present invention to provide an improved and simplified construction of machine of the class and type referred to, and wherein the objects and aims above pointed out, among others, are attained in a simple and efficient manner.

Referring to the drawings 10 and 11, designate the frame bars, which are shown in this instance as channel beams, and which constitute the principal elements of the main frame of the machine. These beams are arranged to extend transversely of the machine and in parallel relation to each other. The beam 10 is supported by vertical standards 12, which, at their upper ends, are secured to brackets 13, connected to the beam 10 for adjustment lengthwise thereof, said beam being provided with bolt holes 14, for that purpose. At their lower ends the standards 12 are secured to bearing blocks 15. Also secured to the bearing blocks 15, are vertically and forwardly inclined standards 16, which at their upper ends are secured to brackets 17, adjustably connected to the beam 11, for adjustment longitudinally thereof in like manner to the adjustment along and connecting to the beam 10 of brackets 13. The standards 12, 16 and brackets 13, 17, and bearing blocks 15, constitute the side members of the machine frame, and form strong, well braced side frames, which, at the same time, are light and durable. By reason of the adjustable connection of the brackets 13, 17, lengthwise of the beams 10, 11, the distance apart of the side frame may be adjustably regulated to correspond to the distance apart of rows of cotton stalks indicated at 18, Fig. 3. Carried by the bearing blocks 15, are short stub axles 19, on which are journaled the supporting wheels 20, thus forming a two-wheeled vehicle. In order to securely brace the side frames of the machine, and efficiently connect and tie the same, each bracket 13 is connected by a cross piece 21, to the corresponding side frame bracket 17.

Suitably suspended from the horizontal frame beams 10, 11, is the hopper, indicated generally by reference numeral 22, which extends or trails downwardly and rearwardly between the side frames of the machine. At its upper end the hopper is provided with side plates 23, which at their extreme upper ends 24, are secured to the frame beam 11, while at their lower ends said side plates are engaged by bolts 25, which are carried by a bracket 26, secured to the beam 10. The hopper 22 is provided with outwardly flaring sides 27, and a rounded end wall 28 at its extreme lower end, the upper side of the hopper being open. Forming the bottom of the hopper is a conveyer, shown in this instance as an endless conveyer 29, though in this respect our invention as defined in the claims, is not to be limited or restricted. The conveyer 29, as shown operates longitudinally of the hopper in the bottom thereof, over suitable guides 30, 31, respectively mounted transversely of the hopper and upper ends thereof. If desired these guides may be in the form of drums or rollers journaled to rotate upon or with shafts 32, 33, which respectively carry said drums.

The conveyer may be actuated in any suitable or convenient manner. A simple drive gear arrangement is shown wherein the shaft 33, which carries the upper guide roller or drum 31 of the conveyer, has mounted thereon a sprocket gear 34, see Fig. 5. Over this gear operates a sprocket chain 35, said chain also operating over a sprocket gear 36, carried by a shaft 37, journaled in the side plates 23, and to which is connected, preferably by means of a flexible joint indicated at 38, a drive shaft 39. This drive shaft is supported in bearing brackets 40 from the standard 12, of one of the side frames, and its extended end carries a gear 41, engaged by a sprocket chain 42, which operates over a sprocket gear 43, carried by the hub to rotate with one of the supporting wheels 20. With this arrangement it will be readily seen that as the machine is progressed along the ground the wheels 20 revolve in contact with the ground thereby driving the conveyer 29.

In order to accommodate the adjustment of the side frames of the machine toward and from each other, as above explained, without disturbing the driving connection of the gearing which operates the conveyer, we provide means whereby the shaft 39 may move longitudinally through the hub of gear 41. To accomplish this we form the extended end 44 of shaft 39 of square or polygonal shape to fit a correspondingly shaped bore of the gear 41.

It may sometimes be desirable to operate the conveyer manually and independently of the drive gearing above described. To accomplish this the gear 34 is connected to the shaft 33 of the upper drum 31, through a clutch 45, which is normally maintained in coupled relation by a spring 46, or otherwise, but which may be uncoupled thereby permitting a hand lever 47, operating through a ratchet 48, see Fig. 5, to drive shaft 33. This operation insures against the possibility of the hopper becoming too greatly clogged in case the machine should remain standing in one place too long while the cotton picking operation is being carried on.

At its extreme upper end the conveyer delivers to a downturned spout or mouth piece 49, below which a bag 50 is positioned to catch or receive the picked cotton delivered through said spout. It is important that the mouth of the bag be maintained distended in proper position below the delivery end of the spout 49, and we have therefore provided a simple and efficient construction for permitting this while at the same time affording ready and easy means for detaching a bag when it becomes filled and replacing it with an empty bag. In accomplishing this result we provide side bars 60, which are attached at their upper ends to the frame beam 10, and extend therefrom forwardly and downwardly and terminate in horizontal end extensions 51, which are attached to side members 52, which are attached to the beams 10, 11, and extend forwardly and downwardly therefrom and are connected together at their forward ends by the cross piece 53. Supported upon the horizontal portions 51 of the side bars 60 are clips 54. A substantially U-shaped metallic member 55, is supported in the clips 54. The arms or legs of the member 55, are provided with bends 56 see Fig. 7, to receive loop portions formed in the mouth of the bag 50, thereby maintaining said mouth distended. When it is desired to remove a bag from its suspending support the side arms or legs of the supporting member 55, are sprung out of their retaining and supporting clips 54, thereby permitting the free ends of said member to rock downwardly and hence permitting the bag loops to readily and easily slide off the same and an empty bag to be slid on in its place. By then restoring the arms of member 55 to engaging relation with their supporting clips the empty bag is properly suspended with distended mouth in position beneath the mouth of delivery chute or spout 49 to receive the cotton deposited therefrom.

We have shown the machine as arranged to be propelled by a horse or mule, in which case the draft tree 61 may be connected in the usual way with the cross piece 53, as clearly shown in Fig. 1, while the shafts 62, may be connected to the ends of the cross piece 52 and may extend forwardly therefrom. If desired, a rack, indicated at 63, may be provided as a carrier for empty bags.

As indicated in Fig. 3, the hopper 22 trails behind the machine frame between adjacent rows of cotton stalks while the wheels 20 operate outside of and along side said rows. The standards 12, 16, serve to elevate the frame beams 10, 11, a sufficient height to permit the cotton stalks to pass thereunder. The portion of the frame which projects forwardly of the vertical plane of the axes of the wheels 20, together with the load imposed thereon is sufficient to counterbalance the trailing hopper, thereby normally maintaining the rear end of the hopper raised from the ground, but this is not essential so far as our invention is concerned.

While we have shown and described a specific structure of machine as a practical and operative embodiment of the principles of our invention, it is evident that many variations and changes in the details may readily occur to persons skilled in the art without departing from the scope of our invention as defined in the claims. But Having now set forth the objects and nature of our invention and a construction embodying the principles thereof, and having explained the purpose, function and mode of operation thereof, what we claim as new and useful and of our own invention, and desire to secure by Letters Patent, is:—

1. In a machine for use in gathering cotton, a frame including transversely extending beams vertical standards supporting the same, journal blocks connected to said standards and carrying stub axles, supporting wheels journaled on said axles, a trailing hopper suspended from said beams, a conveyer operating in said hopper and draft appliances connected to said frame.

2. In a machine for use in gathering cotton, supporting wheels, stub axles on which said wheels are journaled bearing blocks for said axles, vertically extending standards connected to said blocks, transversely extending frame beams supported by said standards, a trailing hopper suspended from said beams, a conveyer operating in said hopper, draft appliances connected to said beams and gearing actuated by one of said wheels for operating said conveyer.

3. In a machine for use in gathering cotton, supporting wheels, stub axles on which said wheels are journaled bearing blocks for said axles, vertically extending standards connected to said blocks, transversely extending frame beams supported by said standards, a trailing hopper suspended from said beams, a conveyer operating in said hopper, draft appliances connected to said beams, gearing actuated by one of said wheels for operating said conveyer, and independent manually actuated devices for operating said conveyer.

4. In a machine for use in gathering cotton, a main frame, supporting wheels therefor, a trailing hopper carried by said frame, a conveyer arranged in said hopper, gearing actuated by said wheels for operating said conveyer, and independent manual devices for operating said conveyer.

5. In a machine for use in gathering cotton, supporting wheels, stub axles on which said frame is supported, a downwardly inclined rearwardly extending hopper suspended from said frame, a conveyer arranged in said hopper, gearing actuated by one of said wheels for operating said conveyer, and manually operated devices for operating said conveyer.

6. In a machine for use in gathering cotton, a main frame including transversely extending beams, side members adjustably connected to said beams, supporting wheels mounted on said side members, a trailing hopper suspended from said main frame, a conveyer operating therein, and means actuated by said wheels for operating said conveyer.

7. In a machine for use in gathering cotton, transversely extending frame beams, brackets mounted thereon for adjustment longitudinally thereof, side standards connected to said brackets, supporting wheels mounted on said standards, a trailing hopper suspended between said side standards, a conveyer operating in said hopper, and gearing driven by one of said wheels for operating said conveyer.

8. In a machine for use in gathering cotton, a transversely extending frame beam, brackets mounted upon the ends of said beam for adjustment longitudinally thereof, vertical side standards carried by said brackets, a bearing block carried by each standard, a stub axle carried by each bearing block, a supporting wheel journaled on each axle, a downwardly inclined rearwardly extending hopper suspended from said beam, a conveyer operating therein, and gearing operated by one of said wheels for actuating said conveyer.

9. In a machine for use in gathering cotton, a main frame, supporting wheels therefor, a trailing hopper carried by said frame, a conveyer operating in said hopper a delivery spout to which said conveyer delivers, forwardly extending members carried by said frame and having horizontal portions positioned beneath the delivery mouth of said spout, a bag supporting member carried by said horizontal portions, and means for operating said conveyer.

10. In a machine for use in gathering cotton and in combination with a main frame and trailing hopper, of a conveyer operating in said hopper, and a bag support arranged below the delivery end of said conveyer, and including a U shaped member and devices with which the arms of said U-shaped member detachably engage for supporting said member.

In testimony whereof we have hereunto set our hands in the presence of the subscribing witnesses, on this 27 day of January, A. D. 1914.

THOMAS E. BROWN.
CARL T. WESTLIN.

Witnesses:
L. H. CAMPBELL,
S. E. DARBY.

Copies of this patent may be obtained for five cents each, by addressing the "Commissioner of Patents, Washington, D. C."